(12) United States Patent
Potter et al.

(10) Patent No.: US 7,155,438 B2
(45) Date of Patent: Dec. 26, 2006

(54) HIGH AVAILABILITY FOR EVENT FORWARDING

(75) Inventors: Tim Potter, Denver, CO (US); Mitch Upton, Highlands Ranch, CO (US); Christa Golding, Littleton, CO (US)

(73) Assignee: BEA Systems, Inc., San Jose, CA (US)

( * ) Notice: Subject to any disclaimer, the term of this patent is extended or adjusted under 35 U.S.C. 154(b) by 347 days.

(21) Appl. No.: 10/293,656

(22) Filed: Nov. 13, 2002

(65) Prior Publication Data

US 2003/0212834 A1 Nov. 13, 2003

Related U.S. Application Data

(60) Provisional application No. 60/376,960, filed on May 1, 2002.

(51) Int. Cl.
G06F 17/30 (2006.01)
G06F 7/00 (2006.01)
G06F 15/173 (2006.01)
G06F 11/00 (2006.01)

(52) U.S. Cl. .................. 707/10; 707/101; 707/102; 707/103.4; 707/104.1; 370/229; 709/241

(58) Field of Classification Search ................ 370/299, 370/229; 709/227, 241; 707/10, 101, 102, 707/103.4, 104.1; 714/18, 50; 705/7; 718/100
See application file for complete search history.

(56) References Cited

U.S. PATENT DOCUMENTS

| | | | |
|---|---|---|---|
| 5,283,897 A | 2/1994 | Georgiadis et al. | |
| 5,892,913 A | 4/1999 | Adiga et al. | |
| 5,951,694 A | 9/1999 | Choquier et al. | |
| 6,021,443 A * | 2/2000 | Bracho et al. | 709/241 |
| 6,023,722 A | 2/2000 | Colyer | |
| 6,078,943 A | 6/2000 | Yu | |
| 6,119,143 A | 9/2000 | Dias et al. | |
| 6,128,279 A * | 10/2000 | O'Neil et al. | 370/229 |
| 6,195,680 B1 | 2/2001 | Goldszmidt et al. | |
| 6,233,607 B1 | 5/2001 | Taylor et al. | |
| 6,253,230 B1 | 6/2001 | Couland et al. | |

(Continued)

OTHER PUBLICATIONS

Richter, Jeffrey, "Advanced Windows Programming", 1996, Microsoft Press (TM), pp. 697-699.*

(Continued)

*Primary Examiner*—Thuy N. Pardo
(74) *Attorney, Agent, or Firm*—Fliesler Meyer LLP

(57) ABSTRACT

High availability event forwarding can be obtained utilizing distributed queues in a server cluster. Each server can receive an event from a data system, such as a database or SAP™ system. Event queues exist on servers in the cluster can store an event until, for example, the event is delivered to a user or retrieved for processing. An event processor examines the load of each event queue and selects the event queue with the lightest load. The event processor generates an alias for the selected queue, such that a user, integration system, or client application does not need to know the identity of the physical queue storing the event, but only needs to refer to the 'distributed queue' or alias. After a physical queue is selected and an alias assigned, the event is forwarded to the selected queue.

This description is not intended to be a complete description of, or limit the scope of, the invention. Other features, aspects, and objects of the invention can be obtained from a review of the specification, the figures, and the claims.

17 Claims, 2 Drawing Sheets

U.S. PATENT DOCUMENTS

| | | |
|---|---|---|
| 6,317,786 B1 | 11/2001 | Yamane et al. |
| 6,374,297 B1 | 4/2002 | Wolf et al. |
| 6,594,786 B1 * | 7/2003 | Connelly et al. ............ 714/50 |
| 6,859,834 B1 * | 2/2005 | Arora et al. ................ 709/227 |
| 6,910,154 B1 * | 6/2005 | Schoenthal .................. 714/18 |
| 2002/0099579 A1 * | 7/2002 | Stowell et al. ................ 705/7 |
| 2004/0194087 A1 * | 9/2004 | Brock et al. ................ 718/100 |

OTHER PUBLICATIONS

U.S. Appl. No. 10/271,194, filed Oct. 15, 2002, Mitch Upton.
U.S. Appl. No. 10/293,059, filed Nov. 13, 2002, Tim Potter et al.
U.S. Appl. No. 10/293,655, filed Nov. 13, 2002, Tim Potter et al.
U.S. Appl. No. 10/293,674, filed Nov. 13, 2002, Tim Potter et al.

* cited by examiner

HIGH AVAILABILITY FOR EVENT FORWARDING

CLAIM OF PRIORITY

This application claims priority to U.S. Provisional Patent Application No. 60/376,960, filed May 1, 2002, entitled "HIGH AVAILABILITY FOR EVENT FORWARDING," which is hereby incorporated herein by reference.

CROSS-REFERENCED CASES

The following applications are cross-referenced and incorporated herein by reference:

U.S. patent application Ser. No. 10/271,194 entitled "Application View Component for System Integration," by Mitch Upton, filed Oct. 15, 2002

U.S. patent application Ser. No. 10/293,059 entitled "High Availability for Asynchronous Requests," by Tim Potter et al., filed Nov. 13, 2002.

U.S. patent application Ser. No. 10/293,655 entitled "High Availability Application View Deployment," by Tim Potter et al., filed Nov. 13, 2002.

U.S. patent application Ser. No. 10/293,674 entitled "High Availability Event Topic," by Tim Potter et al., filed Nov. 13, 2002.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to the forwarding of events and messages to users in a cluster or across a network.

BACKGROUND

In present application integration (AI) systems, there can be several single points of failure. These single points of failure can include deployment or management facilities, event forwarding, event topics, remote clients, event subscriptions, response listeners, and response queues. Each of these features is tied to a single server within a server cluster. If that single server crashes, the entire AI application can become irreparably damaged and must be rebooted via a server reboot.

An AI component can generate events, such as through the use of adapters, that a user may wish to consume through a service such as business process management (BPM). An event forwarding facility of a present AI system forwards events between an application view and a physical BPM event queue. This facility is a single point of failure as well as a performance bottleneck.

BRIEF SUMMARY

Systems and methods in accordance with the present invention can overcome deficiencies in prior art systems by providing for high availability event forwarding. In a server cluster, each server can receive an event from a data source, such as a database or SAP™ system. An event queue resides on at least one of the servers in the cluster, which is capable of storing an event. An event queue can store an event until, for example, the event is delivered to a user or retrieved for processing.

An event processor exists on at least one of the servers in the cluster. The event processor can examine the load of each event queue in the cluster and determine which event queue has the lightest load. The event processor can generate an alias for the selected queue, such that a user, integration system, or client application, for example, can locate the event by specifying the alias. The user does not need to know the identity of the actual physical queue in which the event is stored, but only refers to the 'distributed queue' or alias used to locate the actual physical queue. After the event processor selects a physical queue to act as the distributed queue and assigns an alias, the event can be forwarded to that physical queue.

Other features, aspects, and objects of the invention can be obtained from a review of the specification, the figures, and the claims.

DETAILED DESCRIPTION

Figure 1:
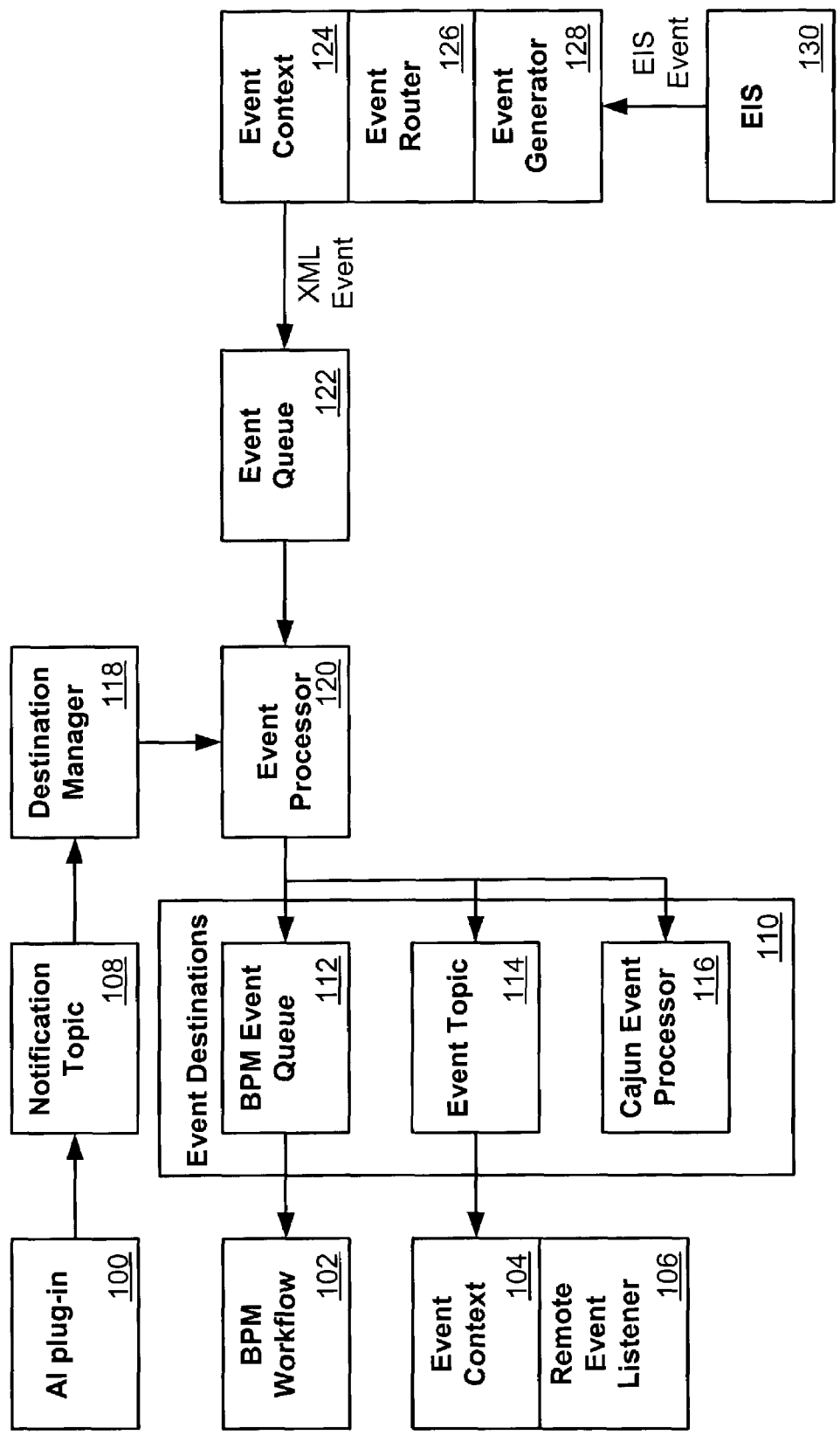
FIG. 1 is a diagram of a system in accordance with one embodiment of the present invention.

A system and method in accordance with one embodiment of the present invention overcomes deficiencies in prior art systems by changing the way in which events are routed throughout an AI system. In present messaging systems, an event router, which can be tightly coupled to an SAP system or database, can receive an event out of the SAP™ system or database and send that event into an integration server. The integration server propagates the event out to anybody who is interested in the event, such as anyone having registered a listener for events of that type. Events can also be propagated to subscribers of an event topic to which that event belongs. Event forwarding is one mechanism for propagating these messages. In present systems, events are forwarded by an event router to a physical queue, from which interested users or clients can retrieve the events. This physical queue is a single point of failure.

In a system in accordance with one embodiment of the present invention, event forwarding is highly available. High availability can be accomplished through the use of distributed queues and/or topics. A distributed queue can server as an alias, and is not a physical queue in a specific server. A highly-available approach allows a user to send a message to a distributed queue. A server in the cluster, such as the one receiving the message, can determine which server in the cluster contains the physical queue with the lightest load that is online and working properly.

After determining which physical queue should receive the message, the server can find that physical queue and put the message on the queue. The user can be unaware of which queue is being used, and may not care. To the user, the message is sent to the alias, or distributed queue. This system is similar to a front end, in that it allows a messaging implementation such as JMS to be highly available, without requiring substantial work on the part of a client. When using a distributed event queue for event forwarding, it is possible to rely on the underlying JMS to do a lot of the high availability work.

Event forwarding in accordance with the present invention can be used with multiple event topics, or with a single distributed event topic. An AI system can create a single JMS Topic for each topic subscriber. Events for a given subscriber can be sent to the topic for the subscriber. Event delivery can also be consolidated onto a single JMS Queue, such as EVENT_QUEUE, for example. This queue can be a distributed queue with multiple physical destinations. A message driven bean (MDB), which can be referred to as an 'AI Event Processor', can listen on the EVENT_QUEUE distributed destination. An onMessage implementation for the MDB can deliver a copy of the event into the BPM event processor, such as if BPM is installed and running in the server instance.

The on Message implementation can also publish a copy of the event onto an event topic, or "EVENT_TOPIC". An event topic is a distributed JMS topic that handles the delivery of events to remote application view clients. An application view class can be modified to create an event context on the event topic. The event context class can be modified to filter messages based on the application view name, which can be stored in a 'SourceKey' JMS header property.

The implementation can deliver a copy of the event into an application view Cajun Control event processor, if such a control is being used. Also, any dequeuing or execution for the implementation can be done transactionally to allow the message to be rolled back onto the queue in the event of a processing failure Using a queue and MDB approach allows exactly one copy of each event to be delivered into a system such as BPM and Cajun, while still using distributed destinations. The use of topics would yield multiple copies if distributed destinations were used. This approach also provides the continued ability to support event delivery to remote application view clients. High availability can be obtained by virtue of the distributed EVENT_QUEUE destination. Multiple servers can participate in the processing of messages for this queue, and thus a single server failure can be accommodated.

This approach also provides for better efficiency, as events can be routed directly to a BPM event processor and application view Cajun Control event processor without requeuing a copy of the message, which can have associated persistence and delivery overhead. A secondary publish to an EVENT_TOPIC can be somewhat costly, but the BPM event processors can be processing the event before the event is sent to the event topic, allowing more direct processing into BPM.

FIG. 1 shows a system that can be used for high-availability event processing in an application integration engine. In an example of event processing, an event occurs in an enterprise information system (EIS) 130. The event data is transferred to an event generator 128 in the resource adapter. The event generator 128 transforms the EIS-specific event data into an XML document and posts an event object, such as an IEvent object, to the event router 126. The event router 126 passes the event object to an event context object 124 for each AI server that is interested in the specific event type. The event context object 124 encapsulates the event object into a JMS object message and sends it to the event queue 122, such as a JMS Queue bound at JNDI context: com.ai.EVENT_QUEUE using a JMS QueueSender. This queue can be a distributed queue, in that the selected queue exists somewhere in the cluster but uses the same alias.

The event object message is stored in the event queue 122 until it is retrieved for processing by the AI event processor 120, which can process events in a first-in-first-out (FIFO) manner. It may not be enough to send a message to a distributed queue and expect the message to be received by a receiver of that distributed queue. There can be a receiver, or "QueueReceiver", receiving or listening on each physical queue to which an event could be forwarded. Thus, an AI event processor can be deployed on all nodes in a cluster. Multiple event processor deployment can further prevent single points of failure.

The event processor 120 can forward the event to all registered event destinations 110, which in the Figure include a BPM event queue 112, an event topic 114, and a Cajun event processor 116. Event destinations can be added by posting a message to a notification topic 108 for application integration. For example, when an AI plug-in 100 for BPM is deployed, it can send an "addDestination" message to the notification topic to register the BPM event queue 112 as an event destination. The BPM event queue can be a distributed queue. A message published on the notification topic can have cluster-wide visibility. Each node in the cluster can have a singleton event destination manager 118 that is a durable subscriber to this topic. Thus, the message can be published to every event destination manager in the cluster.

The event processor can use a singleton event destination manager 118 to listen for add/remove event destination messages on the notification topic 108 to configure the list of event destinations 110. The event object message can be delivered to all registered event destinations in a single transaction, such as in a single Java™ Transaction API (JTA) user transaction. If a post to any event destination 110 fails, the event message can be rolled back to the distributed queue 122. The roll back can use the same alias, but can forward the event to a different physical queue in the cluster. If the event processor 120 receives a message such as one that has "getJMSRedelivered( )" true, the post can be tried again. If the retry fails, the message can be sent to an error queue, which can be a distributed queue for failed event and asynchronous service response messages.

If an AI plug-in 100 for BPM is deployed, the plug-in can add the BPM event queue 112 as an event destination during startup so that AI events are passed to a BPM workflow 102 for processing. If there are any registered application view event listeners 106, the event can be sent to an event topic 114 which will use event context 104 to establish a connection with the remote event listener 106 for the application view.

Figure 2:
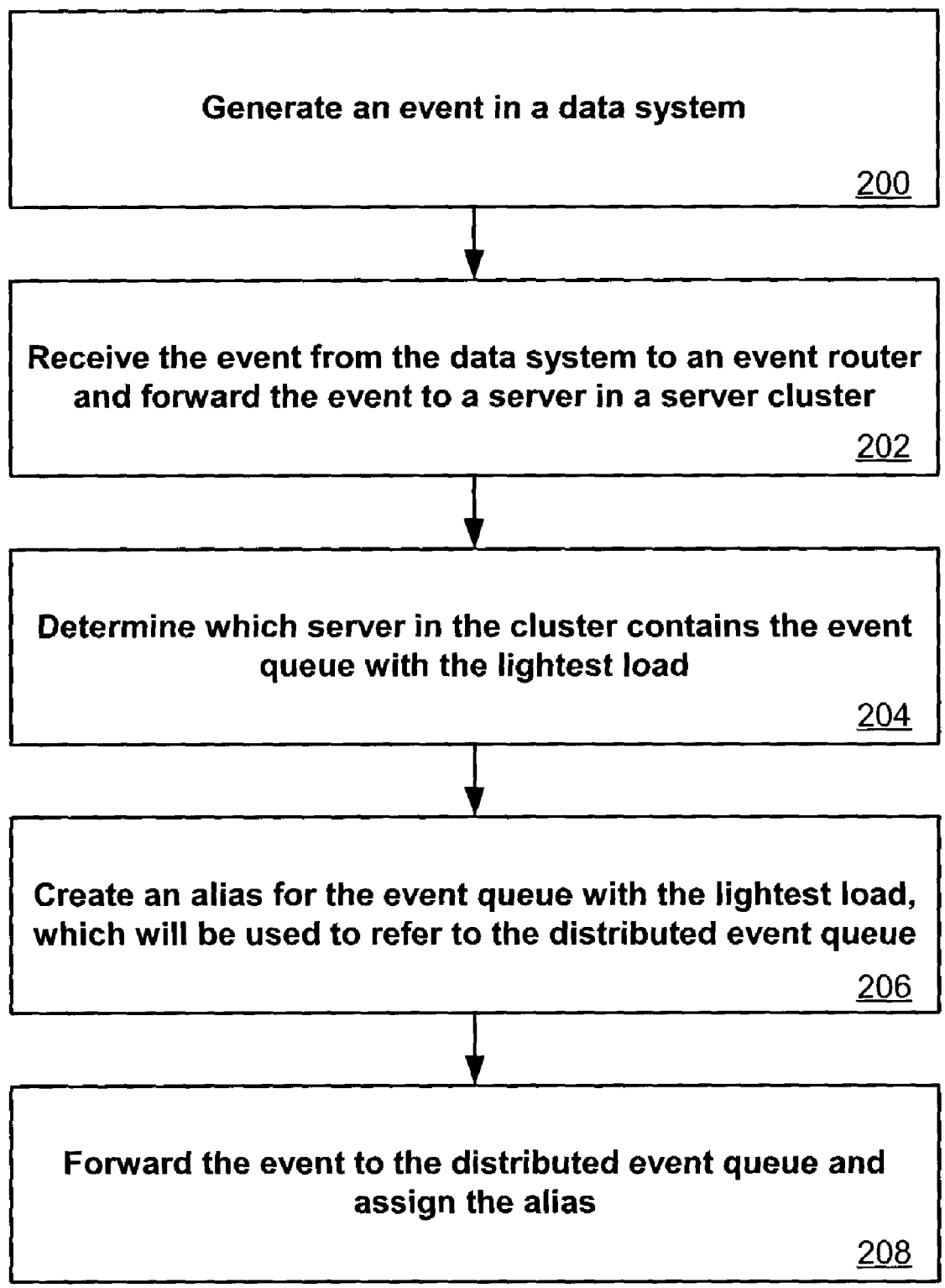
FIG. 2 is flowchart for a method that can be used with the system of FIG. 1.

FIG. 2 shows the steps of a method that can be used with the system of FIG. 1. An event is generated in a data system, such as a database or SAP™ system 200. An event router receives the event from the data system and forwards it to a server in the cluster 202. The server receiving the event determines which server in the cluster contains the event queue with the lightest load 204. The server then creates an alias for the event queue with the lightest load, which will be used to refer to the distributed event queue containing the event 206. The server then forwards the event to the distributed event queue and assigns the alias 208.

An event context class is a frame of reference that can be used to generate and/or receive events. An event context class can be used by an application view to manage the event delivery mechanics in methods such as postEvent and addEventListener. An application view can represent a subset of business functionality that is available, for example, within an EIS. The application view can accept requests for service invocation from a client, and can invoke the proper system functions within the target EIS. An application view can make use of connections provided by a resource adapter to communicate with the EIS.

A service can be a named business function. An application view can manage mapping from the name of the service to the system function in the EIS. Services can expose a simple XML-based request and response interface. Services can return a document definition object for request and response document types that describe the structure and content required for the document type.

An application view can utilize metadata that includes information such as a service name and associated system function. The metadata can also store at least some of the data needed to successfully invoke the system function. As a result, the service can require less request data from the client invoking service, as the application view can augment the data passed by the client with the stored metadata. This is a convenient way to hide the complexity of the underlying system function invocation from the client invoking a service.

In the event of the crash of a cluster server or managed server, an AI application can continue delivering events from adapters running in nodes that are still available. Event generators or routers running in the failed node can restart when the failed node restarts. Users can be notified that in-flight transactions have been cancelled or rolled-back, and should be retried. Wherever possible, the transaction can be retried after reestablishing connections, in order to make use of resources on another live server. One example of AI reestablishing a connection is the event context as used for sending events to AI from an event router.

In the event of an admin server failure, an AI application can do the tasks listed with respect to the crash of a cluster server. The AI application should still be able to boot and reboot successfully using the previous domain and server configuration.

The use of server clustering allows an AI component, such as an event-forwarding server, event queue, or JMS server, to be used in a scalable and highly available fashion. A highly available component does not have any single points of failure, and can migrate services from failed nodes to live nodes in a cluster. Any service offered by an AI component can be targeted to several nodes in a cluster. In the event of a node failure in the cluster, the services located on the failed node can be migrated to another live node in the cluster.

In the event of a crash of a cluster or managed server, the AI application can continue accepting new work. The acceptance of new work can include the deploying and undeploying of application views and connection factories, monitoring of old application views and connection factories, delivering events from adapters, and servicing both synchronous and asynchronous service invocations. An AI application can also support the manual migration of services on the failed node to a live node, such as a singleton MDB listening on a physical destination managed by a failed JMS server. Application integration can use a singleton MDB, such as if a customer needs ordered event processing.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for high availability event forwarding in an integration system, comprising:
   a cluster of servers, each server in the cluster adapted to receive an event;
   event queues on at least some of the servers in said cluster of servers, the event queues adapted to store the event; and
   an event processor on at least one server in said cluster of servers, the event processor adapted to determine the available event queue with the lightest load and forward the event to that event queue, the event processor further adapted to generate an alias for the event queue to which the event is forwarded, wherein the alias abstracts the server location of the determined event queue from a user.

2. A system according to claim 1, further comprising:
   a data system adapted to generate an event.

3. A system according to claim 2, wherein:
   said data system is selected from the group consisting of databases, EIS systems, and SAP™ systems.

4. A system according to claim 2, further comprising:
   an event router adapted to receive the event from the data system and forward the event to the cluster of servers.

5. A system according to claim 1, further comprising:
   a listener on at least one server in the cluster, the listener adapted to listen for the event on each event queue in the cluster.

6. A system according to claim 1, further comprising:
   a listener on each server in the cluster, each listener adapted to listen for the event on each event queue in the cluster.

7. A system according to claim 5, wherein said listener listens for the event on the event queue using the alias.

8. A method for high availability event forwarding in an integration system, comprising:
   receiving an event to server in a cluster of servers;
   determining which server in the cluster contains the event queue with the lightest load;
   creating an alias for the event queue with the lightest load; and
   forwarding the event to the event queue with the lightest load and assigning the alias to that event queue, wherein the alias abstracts the server location of the determined event queue from a user.

9. A method according to claim 8, further comprising:
   generating the event with a data system.

10. A method according to claim 9, further comprising:
    receiving the event from the data system to an event router and forwarding the event to the cluster of servers.

11. A method according to claim 8, further comprising:
    listening for the event on each event queue in the cluster using a listener on at least one server in the cluster.

12. A method according to claim 8, further comprising:
    listening for the event on each event queue in the cluster using a listener on each server in the cluster.

13. A system, comprising:
    means for receiving an event to server in a cluster of servers;
    means for determining which server in the cluster contains the event queue with the lightest load;
    means for creating an alias for the event queue with the lightest load; and means for forwarding the event to the event queue with the lightest load and assigning the alias to that event queue, wherein the alias abstracts the server location of the determined event queue from a user.

14. A computer program product for execution by a server computer for high availability event forwarding in an integration system, comprising:
   computer code for receiving an event to server in a cluster of servers;
   computer code for determining which server in the cluster contains the event queue with the lightest load;
   computer code for creating an alias for the event queue with the lightest load; and
   computer code for forwarding the event to the event queue with the lightest load and assigning the alias to that event queue, wherein the alias abstracts the server location of the determined event queue from a user.

15. A system for high availability event forwarding in an integration system, comprising:
   means for receiving an event to server in a cluster of servers;
   means for determining which server in the cluster contains the event queue with the lightest load;
   means for creating an alias for the event queue with the lightest load; and
   means for forwarding the event to the event queue with the lightest load and assigning the alias to that event queue, wherein the alias abstracts the server location of the determined event queue from a user.

16. A computer system comprising: a processor;
   object code executed by said processor, said object code configured to:
   receive an event to server in a cluster of servers;
   determine which server in the cluster contains the event queue with the lightest load;
   create an alias for the event queue with the lightest load; and
   forward the event to the event queue with the lightest load and assign the alias to that event queue, wherein the alias abstracts the server location of the determined event queue from a user.

17. A system comprising:
   a code segment including instructions to receive an event to server in a cluster of servers;
   a code segment including instructions to determine which server in the cluster contains the event queue with the lightest load;
   a code segment including instructions to create an alias for the event queue with the lightest load; and
   a code segment including instructions to forward the event to the event queue with the lightest load and assign the alias to that event queue, wherein the alias abstracts the server location of the determined event queue from a user.

* * * * *